INVENTOR
PAUL HERMAN SQUIRES

BY *Frank C. Hilberg Jr.*
ATTORNEY

United States Patent Office 3,476,627
Patented Nov. 4, 1969

3,476,627
PROCESS FOR COEXTRUDING MULTIPLE-LAYERED THERMOPLASTIC SHEETING
Paul Herman Squires, Parkersburg, W. Va., assignor to E. I. du Pont de Nemours and Company, Wilmington, Del., a corporation of Delaware
Filed Apr. 12, 1966, Ser. No. 542,066
Int. Cl. B29d 7/04; B32b 27/08
U.S. Cl. 156—244                                              4 Claims

ABSTRACT OF THE DISCLOSURE

Process of extruding multi-layered sheeting of a thermoplastic resin, particularly multiple-layers of plasticized polyvinyl butyral wherein a plurality of streams of thermoplastic resin are fed to a tube which feeds a sheeting die wherein the juncture plane between the resins within the manifold of the die is parallel to the direction of flow of the resin within the manifold as it takes on the form of sheeting and extruding a multi-layered sheeting having the layers of substantially the same thickness across substantially all of the width of the sheeting.

---

Figure 1:
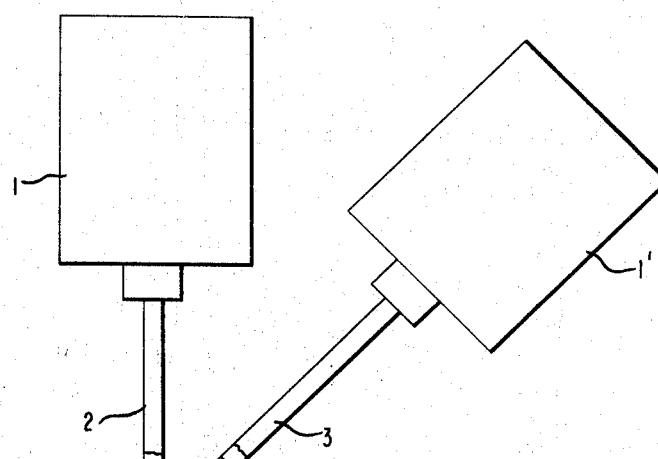

This invention relates to sheeting of thermoplastic resin, and, more particularly, to multiple-layered sheeting thereof.

The process of the present invention provides a method for coextruding multiple-layered thermoplastic sheeting from a single die. Thus it is possible to vary independently the composition of each layer.

Such sheeting is useful, for example, as the resin inner layer of laminated safety glass in which it is desirable to employ a resin sheeting the surface layers of which, adjacent to the glass, have a composition which optimizes adhesion to the glass. Furthermore, it is desirable that the core of the laminate is of a composition which improves tensile properties and thus increases the resistance of the laminated safety glass to penetration upon impact.

The process of the present invention comprises coextruding two or more thermoplastic resins by the following steps. First, streams of molten resin are combined in a tube into a single stream of molten resin, the combined stream possessing sharply defined juncture planes between the components of the combined stream. It is critical in this invention that the flow of the resins through the tube be in a non-turbulent or laminar manner to allow maintaining the sharply defined juncture planes. The combined stream of molten resin is then passed into a sheeting extrusion die. It is important in this step that the juncture planes between each of the individual molten resin components in the combined resin stream be parallel to the direction of flow of the sheeting to be extruded from the die at the point at which the combined resin streams enter the manifold of the sheeting die. In this manner the production of multiple-layered sheeting is achieved.

The thermoplastic resins which are employed in the process of this invention are, generally, those which are processable through an extruder and die, and by the appropriate selection of process variables, such as flow rate, temperature, etc., can be maintained in laminar flow.

Illustrative of useful thermoplastic resins are polyvinyl butyrals, polyamides, polyolefins and modified polyolefins, polyethylene terephthalate, and polyvinyl chloride. There can be present in the resins varying amounts of dyes, additives, plasticizers, and the like.

An especially preferred embodiment of the present invention involves coextrusion of two types of plasticized polyvinyl butyral resin. Polyvinyl butyral is formed by reacting butyraldehyde with polyvinyl alcohol. The alcohol groups left unreacted are calculated as the percent vinyl alcohol remaining in the polymer. Present-day safety-glass laminates are made using a plastic interlayer whose resin is composed of a polyvinyl alcohol partially condensed with butyraldehyde so that it contains from 15% to 30% of unreacted hydroxyl groups calculated as weight percent of vinyl alcohol, less than 3% of ester groups calculated as weight percent of vinyl acetate, and the remaining acetal groups calculated as vinyl butyral. This plastic interlayer is commonly called "polyvinyl butyral," or more exactly "partial polyvinyl butyral." The plasticizer employed in the present invention is generally a water-insoluble ester of a polybasic acid or of a polyhydric alcohol. Particularly desirable plasticizers for use in the present invention are triethylene glycol di(2-ethyl butyrate), dibutyl sebacate, di(beta-butoxyethyl) adipate, and dioctyl phthalate.

When polyvinyl butyral resins are employed as the components of the molten resin layers, it may be desirable, for example, to vary the content of unreacted hydroxyl groups in each layer, as described in U.S. Patent 2,526,728, issued on Oct. 24, 1950 to R. E. Burk and G. S. Stamatoff; to include additives and dyes; to employ varying amounts of plasticizers in each of the layers, as described in U.S. Patent 2,946,711 issued on July 26, 1960, to C. G. Bragaw and W. G. Simeral, etc.

The relative feed rates of the resins to be coextruded may be varied widely. The minimum volume of a given resin component in the combined stream of molten resins can be as low as about 25% of the total combined stream. Thus, for example, with a three-component stream, the volumes of the individual streams can be 25%, 40%, and 35% of the total, respectively. With a two-component resin system, the relative amounts of an individual resin stream can vary from 25 to 75%.

The over-all thickness of the multiple-layered extrusion sheeting produced according to the process of this invention is generally at least 5 mils, as extruded from the die lips, although the sheeting may be subsequently stretched or relaxed to change its ultimate thickness. When plasticized polyvinyl butyral is extruded for use as an interlayer for safety glass, it is customary to extrude sheeting of 15 to 30 mils in thickness.

The process of this invention can be operated in a wide temperature and pressure range, depending upon the melting point of the resin, viscosity, and other factors. While not intended to be limiting, the following are typical process variables in the process of this invention. A temperature of 160–250° C. is typical. The pressure at the point of combination of the resin streams is typically 200–4000 p.s.i. or possibly more often in the 400–1000 p.s.i. range.

The rate of extrusion of the multiple-layered sheeting from the die lips can be varied widely. For example, 100–4000 pounds per hour is a typical range of throughput rates. For a 30-mil sheet about 90 inches wide, a rate of over 2000 pounds per hour was attained in the example below.

A more complete understanding of the present invention may be had by reference to the drawing.

Figure 2:
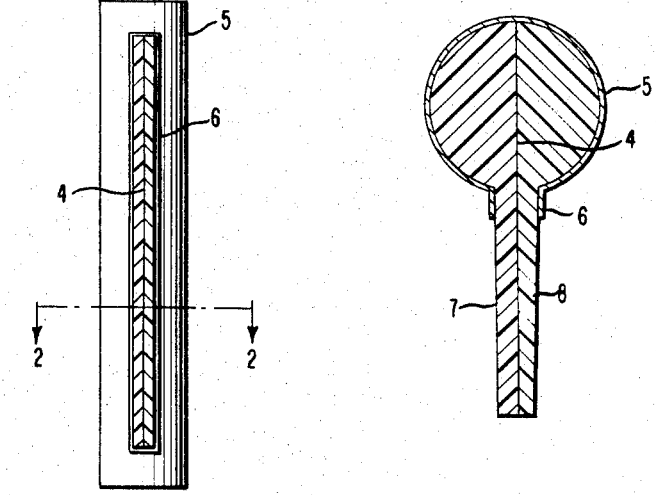

In the drawing:

FIGURE 1 is a schematic view from the bottom of two extruders and a die combining the streams of thermoplastic resin from each of the extruders, and FIGURE 2 is a cross-section taken on the line 2—2 of the sheeting die of FIGURE 1.

The process of the present invention is carried out generally according to the schematic drawings in FIGURES 1 and 2. While FIGURES 1 and 2 make explicit reference to a two-component system for the sake of simplicity, it should be recognized that the process of this invention is applicable to the coextrusion of sheeting with more than two layers.

In carrying out the process of the present invention resins are extruded from the extruders 1 and 1' (or other suitable molten resin delivery systems such as gear pumps) through pipes 2 and 3 and are combined at any convenient angle which causes the juncture planes 4 to be parallel to the direction of extrusion of the sheeting at the point at which the combined resin stream enters the manifold 5. In the figure, of course, there is but one juncture plane since the figure illustrates a two-component system. The combined resin stream is passed into the manifold die 5 so that the juncture plane of the combined stream is parallel to the direction in which the multiple-layered sheeting is extruded from the die.

If the juncture plane of the combined resin stream is parallel to the direction in which the resin is extruded at the point at which the combined resin stream enters the manifold of the die, it is immaterial whether during the pipe run from the point of combination of the component resin streams there is any twisting of the juncture plane. If the juncture plane of the resins is not initially parallel to the direction extrusion, the juncture plane should be oriented as above during the pipe run, it is important that the flow be laminar in the pipe run and that there be a minimum of disturbance of the flow streamlines.

The multi-layered sheeting is extruded from the die through the die lips 6, that is, in a direction perpendicular to the plane of FIGURE 1, toward the viewer. The extruded sheet can then be drawn off by a roller, if desired.

In FIGURE 2, a cross-section of the die at the plane 2—2, it is seen that the juncture plane 4 is maintained as the molten resin passes through the die lips 6 and appears as a "weld line" between the layers 7 and 8 of the extruded plastic sheeting.

When sheeting with more than two layers is formed according to this invention more than two resin inlet pipes are employed. It is immaterial with, for example, a three-component system, whether the three components are combined at one point or whether two are combined followed by the combination of the third resin at a second point downstream. Any of the above-mentioned combinations are possible so long as the juncture planes between each of the resin components of a multiple-resin system are parallel to one another.

The drawing explicitly refers to an end-fed extrusion die. It is readily recognized that a center-fed die which permits the combined resin stream to be fed into the manifold such that the juncture plane is parallel to the direction in which the sheeting is extruded is useful in this process. Thus, the inlet of the combined molten resin stream should be at the side of the manifold opposite the die lips in the case of a center-fed die.

In order that the invention may be better understood, the following detailed example is given in addition to the examples already given above. All percentages and parts herein are expressed by weight unless otherwise noted.

Example

Two resin streams were employed, each of plasticized polyvinyl butyral. The polyvinyl butyral was formed by reacting butyraldehyde with polyvinyl alcohol formed by hydrolyzing polyvinyl acetate. The alcohol groups left unreacted, calculated as the percentage of vinyl alcohol remaining in the polymer, amounted to 22.5%. The resin contained 45 parts of triethylene glycol di-(2-ethyl butyrate) plasticizer per 100 parts of the polyvinyl butyral resin.

The resin from one extruder had mixed therein about 0.05–0.10% of a soluble blue anthraquinone dye, whereas the resin from the other extruder contained no dye.

The melt delivery rate from each of the twin-screw extruders was precisely controlled using a cascade control system which adjusted the speed control of the feeding device to the extruder in response to a signal which represented power consumption of the main extruder drive motor. The control point on the power control system was set by a signal from a gamma radiation detector which measured the amount of polymer "back-up" from the final pumping section of the extruder, which was maintained completely full of molten resin. The backed-up melt rode as a ball of polymer on top of and between the twin screws in a partially empty section of the extruder preceding the final pumping section. The radiation source was inside one of the twin screws. The signal from the ball-measuring system reset the power control point such that it demanded increased power (that is, increased feed rate) when the ball size decreased.

The output of the extruder employing tinted resin was 55% of the total. The pressure in the resin pipe just outside the extruder delivering tinted resin was 1850 p.s.i., and that outside the extruder delivering untinted resin was 1500 p.s.i., both pressures being measured upstream of a resin-filtering device (screen packs) on each extruder.

Each molten resin stream was extruded into a steam-jacketed 4-inch I.D. stainless-steel pipe. The two streams of molten resin were combined at a Y connection. The plane of the Y connection was horizontal, so that the juncture plane of the combined resin stream was vertical. The extrusion opening in the end-fed sheeting die employed in this experiment was parallel to the juncture plane of the combined molten resin stream, and opened at the bottom of the extrusion die.

The manifold of the die was about 100 inches long and about 4 inches I.D. and opened at the bottom into an extrusion slit 90 inches long and 32 mils wide. The sheeting as it emerged from the die (at a rate of 2150 pounds per hour) was stretched to form a sheet about 30 mils thick. Then 1 to 2 inches was trimmed off each end of the sheet.

The untrimmed extruded sheeting from this run was clearly seen to constitute a tinted layer and an untinted layer. The layers of the sheeting were of quite uniform thickness over the width of the sheeting, except at the very edge of the sheeting which had been trimmed off.

Irregularities at the ends of the sheeting are not considered consequential since this portion is usually trimmed away before use.

The dye profile of the two-layered sheeting is found in the table. The data therein, measured on the sheeting at the distances from one edge of the untrimmed sheeting as specified in the first column at the left, show that the thickness of the tinted layer of the sheeting averages about 55% of the sheeting.

The foregoing detailed description has been given for clearness of understanding only, and no unnecessary limitations are to be understood therefrom. The invention is not limited to the exact details shown and described since obvious modifications will occur to those skilled in the art.

The resins employed in each layer according to this process can be of the same type, but with differing additives or amounts thereof. Moreover, coextrusion of chemically different resins which have similar processing characteristics (such as temperature and viscosity) and which will adhere to one another is possible according to this invention.

TABLE.—DYE PROFILE OF COEXTRUDED SHEETING

| Distance From Edge, inches | Total Thickness of Sheeting at that Distance, mil | Thickness of Tinted Layer of Sheeting, mil | Percent Tinted |
|---|---|---|---|
| 0 | 26 | 0 | 0 |
| 15 | 26 | 18 | 50 |
| 30 | 32 | 18 | 56 |
| 45 | 34 | 19 | 56 |
| 60 | 33 | 18 | 55 |
| 75 | 30 | 17 | 57 |
| 90 | 23 | 17 | 74 |

What is claimed is:
1. A process for the extrusion of multiple-layered sheeting of thermoplastic resin, said process comprising the steps of
   (a) joining in a tube, at least two laminar-flow streams of molten thermoplastic resin into a combined stream of molten thermoplastic resin which has a sharply defined juncture between the components of the combined stream,
   (b) passing said combined stream of molten thermoplastic resin into a manifold of a sheeting extrusion die the juncture plane(s) between each of the individual molten thermoplastic resin components within the manifold being parallel to the principal direction of flow of the resin as it passes from the manifold and takes on the shape of sheeting, and
   (c) whereby a multiple-layered sheeting wherein the individual layers of thermoplastic resin are of substantially uniform thickness over substantially all of the width of the sheeting is formed.

2. The process of claim 1 wherein the thermoplastic resin in each of the streams is plasticized polyvinyl butyral.
3. The process of claim 1 wherein the die used is an end-fed sheeting die.
4. The process of claim 3 wherein the thermoplastic resin in each of the streams is plasticized polyvinyl butyral.

References Cited

UNITED STATES PATENTS

| | | | |
|---|---|---|---|
| 2,901,770 | 9/1959 | Beck | 156—244 X |
| 3,209,402 | 10/1965 | Riley et al. | 18—8 |
| 3,381,074 | 4/1968 | Bryan et al. | 264—171 |
| 3,399,105 | 8/1968 | Breidt et al. | 161—102 |

HAROLD ANSHER, Primary Examiner

T. R. SAVOIE, Assistant Examiner

U.S. Cl. X.R.

18—13; 156—500; 264—171